(12) United States Patent
Nakanishi et al.

(10) Patent No.: US 11,385,815 B2
(45) Date of Patent: Jul. 12, 2022

(54) STORAGE SYSTEM

(71) Applicant: HITACHI, LTD., Tokyo (JP)

(72) Inventors: Hidechika Nakanishi, Tokyo (JP); Hiroshi Izuta, Tokyo (JP)

(73) Assignee: HITACHI, LTD., Tokyo (JP)

(*) Notice: Subject to any disclaimer, the term of this patent is extended or adjusted under 35 U.S.C. 154(b) by 343 days.

(21) Appl. No.: 16/495,450

(22) PCT Filed: Aug. 30, 2017

(86) PCT No.: PCT/JP2017/031068
§ 371 (c)(1),
(2) Date: Sep. 19, 2019

(87) PCT Pub. No.: WO2019/043815
PCT Pub. Date: Mar. 7, 2019

(65) Prior Publication Data
US 2020/0057573 A1    Feb. 20, 2020

(51) Int. Cl.
*G06F 3/06* (2006.01)
*G06F 12/0804* (2016.01)
*G06F 11/10* (2006.01)

(52) U.S. Cl.
CPC .......... *G06F 3/0634* (2013.01); *G06F 3/0625* (2013.01); *G06F 3/0659* (2013.01); *G06F 3/0689* (2013.01); *G06F 12/0804* (2013.01); *G06F 11/1076* (2013.01); *G06F 2212/304* (2013.01)

(58) Field of Classification Search
CPC ............. G06F 11/1076; G06F 12/0804; G06F 12/0868; G06F 2212/304; G06F 2212/312; G06F 3/0625; G06F 3/0634; G06F 3/0659; G06F 3/0689; Y02D 10/00
See application file for complete search history.

(56) References Cited

U.S. PATENT DOCUMENTS

| 9,304,901 B2* | 4/2016 | Weber .................... G06F 11/16 |
| 2005/0160221 A1* | 7/2005 | Yamazaki ............. G06F 3/0625 711/114 |
| 2008/0126702 A1 | 5/2008 | Zimoto et al. |
| 2008/0204920 A1* | 8/2008 | Muramatsu .......... G11B 17/228 360/71 |

FOREIGN PATENT DOCUMENTS

| JP | 2005-228288 A | 8/2005 |
| JP | 2008-243177 A | 10/2008 |
| JP | 2009-163310 A | 7/2009 |

* cited by examiner

*Primary Examiner* — Terrell S Johnson
(74) *Attorney, Agent, or Firm* — Volpe Koenig

(57) ABSTRACT

A storage system includes a redundancy group formed of storage drives that stores host data and redundant data in a distributed manner, and a controller that controls access to the redundancy group. The controller is configured to: select, from among the storage drives in the redundancy group, a part of the storage drives in an upper limit number equal to or smaller than a redundancy level of the redundancy group, and set the part of the storage drives to a power saving state; receive, from a host, a read request with respect to a target storage drive in the redundancy group; and restore, when the target storage drive is in the power saving state, target data corresponding to the read request from data collected from a part of the storage drives different from the target storage drive in the redundancy group, and return the target data to the host.

12 Claims, 10 Drawing Sheets

| C/R# | PG# | DRIVE TYPE | POWER STATE | HOST ACCESS MONITORING REFERENCE TIME PERIOD [min] | LAST WRITE REQUEST RECEPTION TIME |
|---|---|---|---|---|---|
| 00/00 | 00 | SSD | NORMAL | 10 | 2017/01/06 23:00:00 |
| 00/01 | 00 | SSD | NORMAL | 10 | 2017/01/06 23:00:00 |
| 00/02 | 00 | SSD | NORMAL | 10 | 2017/01/06 23:00:00 |
| 00/03 | 00 | SSD | NORMAL | 10 | 2017/01/06 23:00:00 |
| 00/04 | 00 | SSD | NORMAL | 10 | 2017/01/06 23:00:00 |
| 00/05 | 00 | SSD | POWER SAVING | 10 | 2017/01/06 23:00:00 |
| 01/00 | 01 | HDD | NORMAL | 30 | 2017/01/23 19:00:00 |
| 01/01 | 01 | HDD | NORMAL | 30 | 2017/01/23 19:00:00 |
| 01/02 | 01 | HDD | NORMAL | 30 | 2017/01/23 19:00:00 |
| 01/03 | 01 | HDD | NORMAL | 30 | 2017/01/23 19:00:00 |
| 01/04 | 01 | HDD | POWER SAVING | 30 | 2017/01/23 19:00:00 |
| 01/05 | 01 | HDD | POWER SAVING | 30 | 2017/01/23 19:00:00 |
| 02/00 | 02 | SSD | NORMAL | 10 | 2017/01/23 19:30:00 |
| 02/01 | 02 | SSD | NORMAL | 10 | 2017/01/23 19:30:00 |
| 02/02 | 02 | SSD | NORMAL | 10 | 2017/01/23 19:30:00 |
| 02/03 | 02 | SSD | NORMAL | 10 | 2017/01/23 19:30:00 |
| 02/04 | 02 | SSD | NORMAL | 10 | 2017/01/23 19:30:00 |
| 02/05 | 02 | SSD | POWER SAVING | 10 | 2017/01/23 19:30:00 |
| 02/06 | 02 | SSD | POWER SAVING | 10 | 2017/01/23 19:30:00 |

DRIVE MANAGEMENT TABLE

FIG. 4

PG MANAGEMENT TABLE

DRIVE BOX MANAGEMENT TABLE

STORAGE SYSTEM

BACKGROUND

This invention relates to a storage system.

Most storage systems have a power saving function for reducing power consumption. For example, in Patent Literature 1, there is disclosed a storage system configured to allow an administrator to apply power saving to a desired storage apparatus from a management apparatus. The storage system includes: a power saving instruction reception module configured to receive from a management console a power saving instruction for designating at least one storage apparatus included in a plurality of RAID groups, a plurality of logical units, and a plurality of physical storage apparatus; and a power saving control module configured to apply power saving to at least one physical storage apparatus corresponding to the storage apparatus designated by the power saving instruction.

Patent Literature 1: US 2008/0126702 A1

SUMMARY

Storage systems are constantly required to improve responsiveness. With the rising number of cases in which storage systems are built through use of flash drives, increasing importance has been placed on guarantee of responsiveness of the storage systems. Therefore, it is desired to provide a technology for improving responsiveness to a host under a power saving state of a storage system.

An aspect of this invention is a storage system, including: a redundancy group formed of a plurality of storage drives configured to store host data and redundant data in a distributed manner; and a controller configured to control access to the redundancy group. The controller being configured to: select, from among the plurality of storage drives in the redundancy group, a part of the plurality of storage drives in an upper limit number equal to or smaller than a redundancy level of the redundancy group, and set the part of the plurality of storage drives to a power saving state; receive, from a host, a read request with respect to a target storage drive included in the redundancy group; and restore, when the target storage drive is in the power saving state, target data corresponding to the read request from data collected from a part of the plurality of storage drives different from the target storage drive in the redundancy group, and return the target data to the host.

According to at least one aspect of this disclosure, it is possible to improve the responsiveness of the storage system during power saving.

BRIEF DESCRIPTION OF THE DRAWINGS

FIG. 4 shows an example of the structure of the drive management table.

DETAILED DESCRIPTION OF THE EMBODIMENTS

Figure 1:
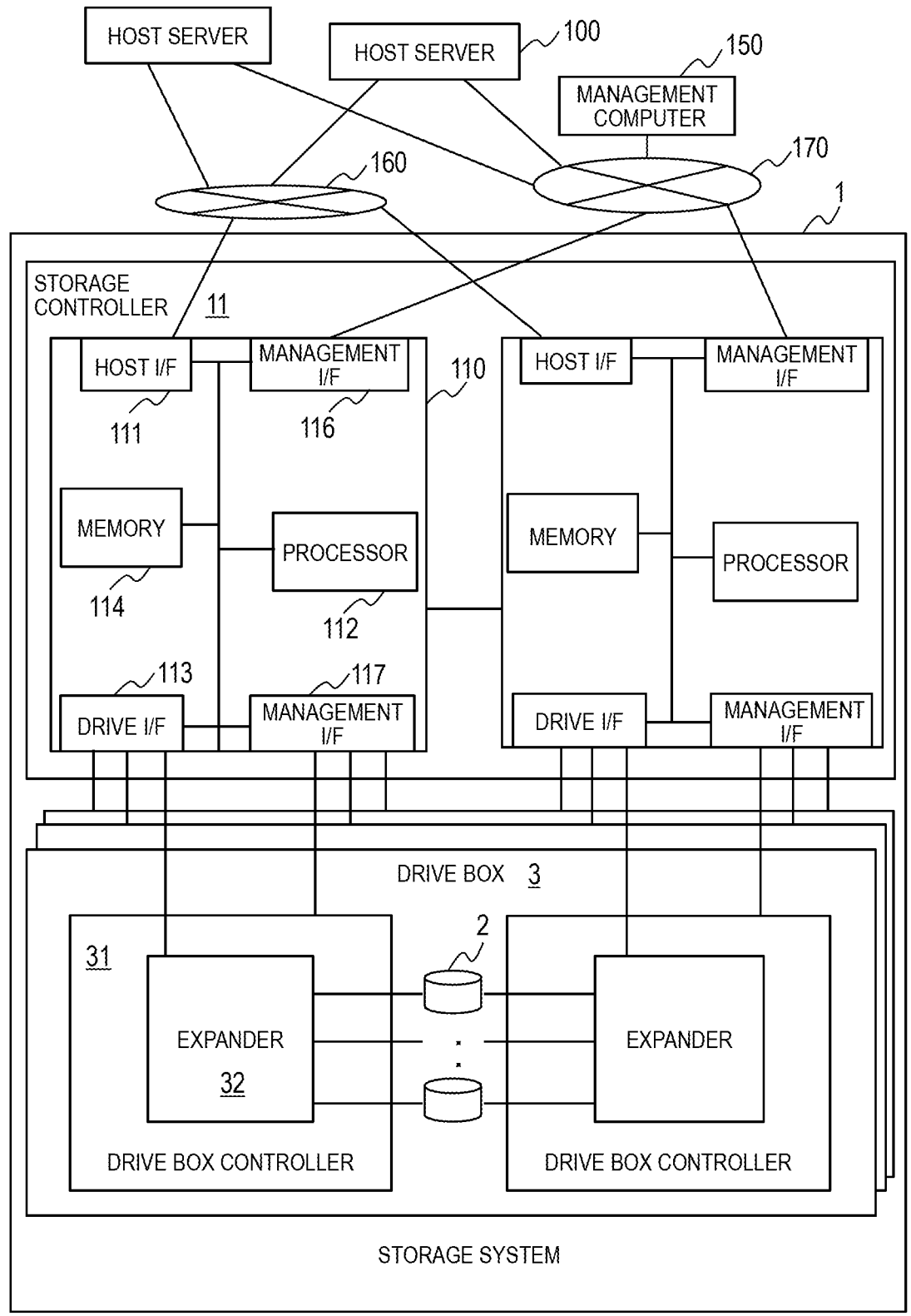
FIG. 1 is an illustration of an example of a computer system.

Hereinafter, embodiments of the present invention will be described with reference to the accompanying drawings. It should be noted that embodiments are merely examples for realizing the present invention and does not limit the technical scope of the present invention. The same reference numerals are given to a common configuration element in the drawings.

A description including a sentence whose subject is a program may be a description including a sentence whose subject is a central processing unit (CPU) because the program performs predetermined processing by being executed by the CPU while using a memory and a communication port (communication control device).

Further, the processing disclosed by using the program as the subject of a sentence may also be processing performed by a computer, such as a server computer, a storage controller, and a management computer, or an information processing apparatus. A part or an entirety of the program may be implemented by dedicated hardware, or may be modularized. Different kinds of program may be installed into each computer through a program distribution server or a storage medium. Meanwhile, a description including a sentence whose subject is a processor or a CPU may be a description including a sentence whose subject is a control program operating on the processor.

A storage system according to at least one embodiment controls a power state of a storage drive. In regard to storage drives that form a parity group (redundancy group), the storage system changes the storage drives to a power saving state in a range equal to or smaller than the redundancy level of the parity group. The storage drives in the parity group each store a block that forms one stripe line. A part of data in the stripe line is host data (user data), and the other part of data is redundant data. The redundancy level indicates the number of redundant data blocks in the stripe line.

When receiving a read request with respect to the storage drive in a power saving state, the storage system collects data from the storage drive in a normal state in the parity group, and restores the requested data. The storage system transmits the restored data to a request source. This reduces power consumption of the parity group, and can suppress deterioration of responsiveness to the read request.

FIG. 1 is an illustration of an example of a computer system. In FIG. 1, reference symbols that denote some components of the same kind are omitted. The computer system mainly includes a host server 100 configured to perform an arithmetic/logic operation on data, a storage system 1 configured to store data, and a management computer 150 configured to manage the storage system 1 and the host server 100.

The host server 100 and the storage system 1 are coupled to each other through a data network 160. The data network 160 is, for example, a storage area network (SAN). The host server 100, the management computer 150, and the storage system 1 are coupled to one another through a management network 170. The management network 170 is, for example, a local area network (LAN).

The host server 100 and the management computer 150 each have, for example, a general computer configuration. The computer configuration includes, for example, a memory configured to store data, a processor configured to operate in accordance with a program stored in the memory, and an interface for coupling to a network. The computer configuration may further include a user input/output apparatus.

The storage system 1 includes a plurality of storage drives 2 and at least one drive box 3. Each drive box 3 accommodates at least one storage drive 2. The storage system 1 includes a storage controller 11 configured to control the drive box 3 while communicating to/from the host server 100 and another storage system.

Each storage drive 2 is a final physical storage device for the host data. Each storage drive 2 is a storage drive of a freely-selected type, for example, a hard disk drive (HDD) or a solid state drive (SSD). The HDD is a magnetic disk drive, and the SSD is a flash memory drive.

Each of the components described below may be formed of a dedicated large scale integration (LSI), or may be a processor configured to execute software. In at least one embodiment, there are no limitations imposed on physical boundaries between the components. For example, the host server 100 and the storage system 1 may be implemented in a single physical casing.

The storage controller 11 has a redundant configuration, and includes a plurality of controller packages 110. The number of controller packages 110 may be one. The controller package 110 includes a host interface (hereinafter referred to as "host I/F") 111 configured to communicate to/from the host server 100, a management I/F 116 configured to communicate to/from the management computer 150, a drive interface (hereinafter referred to as "drive I/F") 113 configured to communicate the host data (data stored in the storage drive 2) to/from the drive box 3, and a management I/F 117 configured to communicate management data (control data) to/from the drive box 3.

The controller package 110 includes: a processor 112 configured to control another component and relay data transfer; a memory 114 configured to store data generated by the host server 100, various kinds of data generated for control in the storage system 1, and the host data; and a cache memory configured to temporarily store the host data. The number of components of the controller packages 110 may be one, or may be two or more.

The host I/F 111 converts protocol data used for communication between the host server 100 and the storage controller 11 into protocol data used in the storage controller 11. Examples of a communication protocol used for the communication to/from the host server 100 include Fibre Channel (FC), Fibre Channel over Ethernet (FCoE), and Internet SCSI (iSCSI). Examples of an internal protocol include PCI-Express.

The drive I/F 113 converts protocol data used for communication between the storage drive 2 and the storage controller 11 into protocol data used in the storage controller 11. Examples of a protocol used for communication between the storage drive 2 and the storage controller 11 include FC, Serial Attached SCSI (SAS), and NVM Express (NVMe).

The processor 112 includes a data bus for transferring data to/from the host I/F 111, the drive I/F 113, the management I/F 116, the management I/F 117, and the memory 114, and an arithmetic circuit for executing software. The processor 112 operates in accordance with a program stored in the memory 114, to thereby function as a predetermined functional module. As described later, the processor 112 executes power control for the storage drive 2 and the drive box 3 in addition to I/O processing for the host data. Another LSI may be used in place of the processor 112.

The memory 114 is formed of a DRAM or other such storage element that allows fast access, and is coupled to the processor 112 through a memory interface of, for example, DDR3 or DDR4. The memory 114 may be formed of a plurality of memory modules.

The memory 114 includes a cache memory area for temporarily storing the host data (I/O target data) with respect to the storage drive and a shared memory area for storing various kinds of management information on the storage system 1. Pieces of data in the cache memory area and the shared memory area are made redundant with the cache memory areas and the shared memory areas in the memories 114 in a plurality of controller packages 110 in preparation for failures. The memory 114 further includes a temporary storage area of data that is not made redundant.

The storage controller 11 forms redundant arrays of inexpensive disks (RAID) based on the plurality of storage drives 2, which are coupled to each other through the drive I/Fs 113. In this disclosure, a group of the storage drives 2 configured to store the redundant data and the host data, which includes the RAID, is referred to as "parity group (PG)". The storage controller 11 sets the storage areas of any number of storage drives 2 (parity group) as one volume so as to allow access from the host server 100.

When receiving a write request with respect to the volume from the host server 100, the storage controller 11 generates parity data (redundant data) depending on the RAID configuration, and writes the host data and the parity data to different storage drives 2.

When receiving the read request with respect to the volume from the host server 100, the storage controller 11 attempts to read the requested data from the storage drive 2, and then examine the presence or absence of a data loss. When a data loss is detected, the storage controller 11 uses other host data and other parity data in the RAID to restore the requested data, and transfers the restored requested data to the host server 100. This functionality improves reliability, availability, and I/O performance.

The storage controller 11 forms one parity group from a plurality of (for example, four) storage drives 2. When a failure has occurred in one storage drive 2 and data cannot be accessed, the storage controller 11 uses the data stored in the remaining storage drives 2 in the same parity group to restore the data that was stored in the storage drive 2 in which the failure has occurred.

In order to process an I/O request (read request or write request) received from the host server 100, the storage controller 11 uses a volume management table (not shown) to manage a correspondence relationship between the address space of a volume and the address space of the storage drives 2. The I/O request received from the host server 100 is also referred to as "host access".

The storage controller 11 divides the address space of a volume into a plurality of storage areas of a fixed size, and associates each storage area with a storage area in the parity group. The storage area in the parity group is identified by the identifier of the storage drive 2 and a logical address in the storage drive. A known technology is used for the management of the correspondence relationship between the volume and the storage drive 2, and a description thereof is omitted.

The storage system 1 includes a plurality of drive boxes 3. The number of drive boxes 3 to be mounted in the storage system 1 may be one, or the drive box 3 may be omitted. The drive box 3 includes a plurality of slots each accommodating one storage drive 2, which are not shown in FIG. 1, and at least one drive box controller 31. The drive box 3 accommodates at least one storage drive 2.

In the example of FIG. 1, two drive box controllers 31 for achieving redundancy are mounted to one drive box 3. The number of drive box controllers 31 may be one, or three or more.

The drive box controller 31 transfers requests (commands) and host data between the storage controller 11 and the storage drives 2 accommodated in the drive box 3. The drive box controller 31 supplies electric power to each of the accommodated storage drives 2. The drive box controller 31 controls the power consumption of a specific one of the storage drives 2. The drive box controller 31 controls the power consumption of the drive box 3 in accordance with an instruction received from the storage controller 11.

The drive box controller 31 includes an expander 32. The expander 32, which is a switch, transfers data (including requests and host data) from the storage controller 11 to the storage drive 2 of a transmission destination, and also transfers the data from the storage drive 2 to the storage controller 11. The storage drive 2 is identified by, for example, a drive box number and a slot number in a drive box. The expander 32 enables communication to/from a plurality of storage drives 2 through one port of the storage controller 11.

Figure 2:
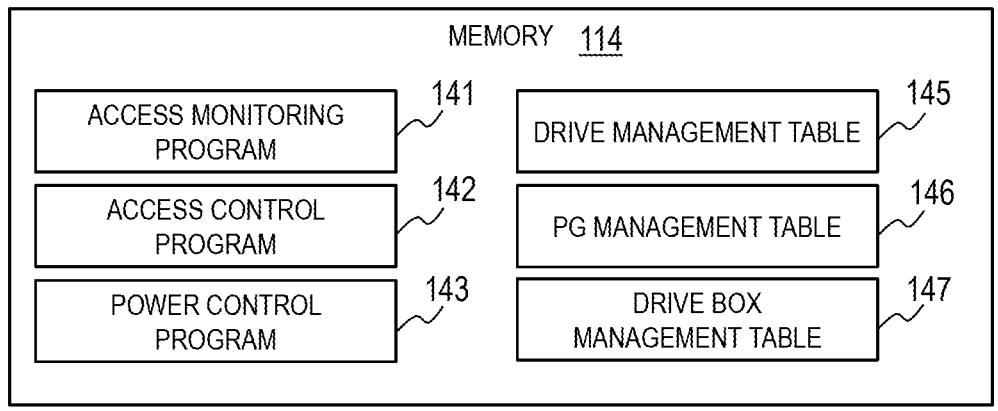
FIG. 2 is an illustration of data (software) stored in the memory.

FIG. 2 is an illustration of data (software) stored in the memory 114. The memory 114 stores an access monitoring program 141, an access control program 142, and a power control program 143. The memory 114 further stores a drive management table 145, a PG management table 146, and a drive box management table 147.

The access monitoring program 141, the access control program 142, and the power control program 143, which are illustrated in FIG. 2, are stored in each of the controller packages 110, while the information of the drive management table 145, the PG management table 146, and the drive box management table 147 is shared by the controller packages 110. The processor 112 operates in accordance with the access monitoring program 141, the access control program 142, and the power control program 143, to thereby function as an access monitoring program, an access control module, and a power control module, respectively.

The access monitoring program 141 monitors access (host access) to each storage drive 2 made from the host server 100. The access control program 142 controls an I/O request (host access) to the storage drive 2 made from the host server 100. The power control program 143 controls the power consumption of the storage drive 2 and the drive box 3.

Figure 3:
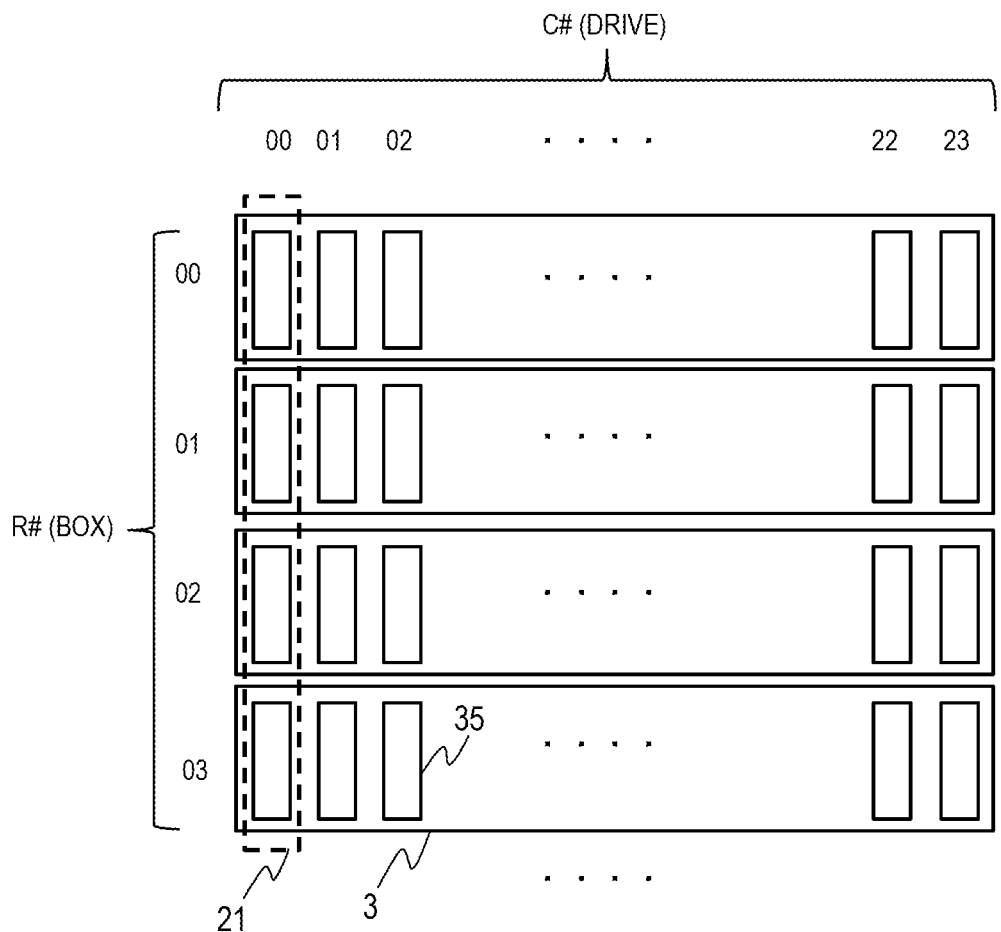
FIG. 3 is a schematic illustration of an example of a configuration of the drive boxes and accommodation positions of the storage drives that form a parity group recommended for a user in the drive boxes.

FIG. 3 is a schematic illustration of an example of a configuration of the drive boxes 3 and accommodation positions of the storage drives 2 that form a parity group recommended for a user in the drive boxes 3. The drive box 3 includes a plurality of slots 35. The drive boxes 3 are each identified by a row number (R #).

The slots 35 in each drive box 3 are each identified by a column number (C #). In FIG. 3, the slots 35 arranged in a matrix shape are illustrated in order to illustrate C #of the slots 35 and R #of the drive boxes 3. A physical arrangement of the slots 35 is not required to be a matrix shape.

The frame of the broken line illustrated in FIG. 3 indicates an example of a slot group 21 that accommodates the storage drives 2 that form one parity group. The number of storage drives 2 that form this parity group is four. The slot group 21 is formed of the slots 35 of the drive boxes 3 that all differ from each other. This arrangement of the drives is recommended for the user.

As described later, in this arrangement of the drives, the storage drive 2 in a power saving state can be biased to a specific drive box 3. The power saving state of the storage drive 2 includes a power-off state, and a low power consumption state during a power-on state. For example, a power-off state and a state in which disk rotation is stopped during a power-on state each indicate the power saving state of an HDD.

In FIG. 4, an example of the structure of the drive management table 145 is shown. The drive management table 145 is used to manage information on the storage drives 2. Specifically, the drive management table 145 holds information on the parity group to which each storage drive 2 belongs, the power state of each storage drive 2, and access to each storage drive 2. The drive management table 145 includes a C/R #column 451, a PG #column 452, a drive type column 453, a power state column 454, a host access monitoring reference time period column 455, and a last write request reception time column 456.

The C/R #column 451 indicates the number (R number) of the drive box 3 in which the storage drive 2 is accommodated and the number (C number) of the slot 35 in which the storage drive 2 is accommodated. The PG #column 452 indicates the number of the parity group to which the storage drive 2 belongs. The drive type column 453 indicates the type of the storage drive 2.

The power state column 454 indicates the current power state of the storage drive 2. The power state indicates a normal state or a power saving state. The host access monitoring reference time period column 455 indicates a reference for changing the power state of the storage drive 2 from the normal state to the power saving state. The last write request reception time column 456 indicates the reception time of the last write request with respect to the storage drive 2. The reception time is, for example, a time at which the storage controller 11 receives a write request.

Figure 5:
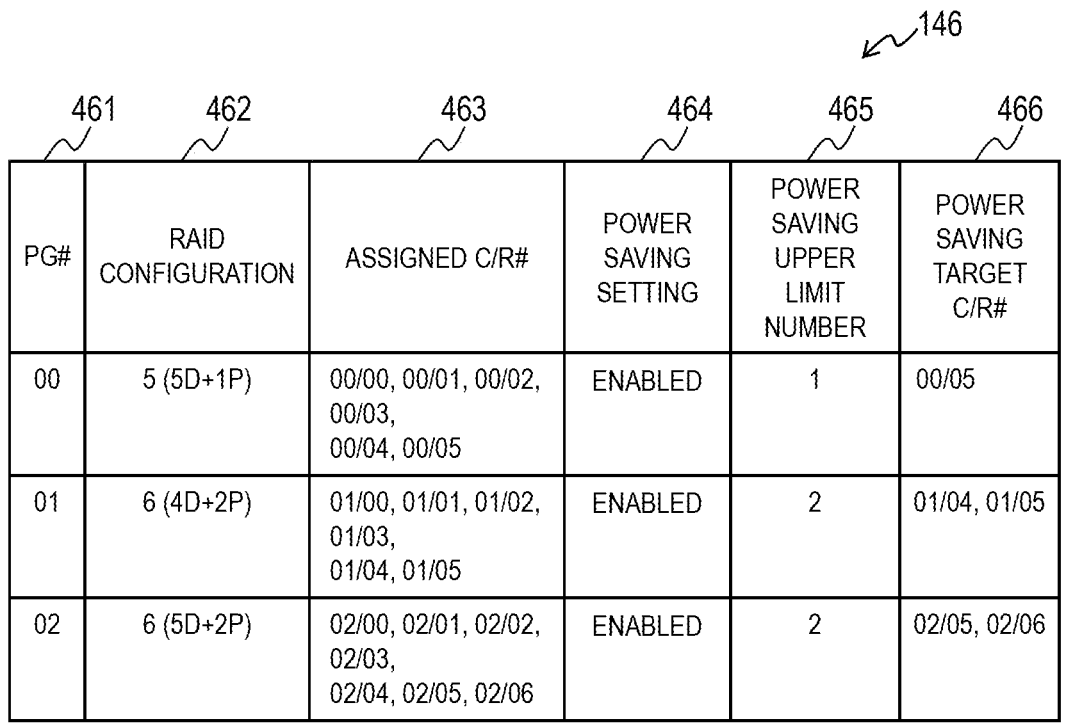
FIG. 5 shows an example of the structure of the PG management table.

In FIG. 5, an example of the structure of the PG management table 146 is shown. The PG management table 146 is used to manage information on the parity groups. Specifically, the PG management table 146 includes information on the storage drives 2 that form a parity group and the power saving setting of the parity group.

The PG management table 146 includes a PG #column 461, a RAID configuration column 462, an assigned C/R #column 463, a power saving setting column 464, a power saving upper limit number column 465, and a power saving target C/R #column 466.

The PG #column 461 indicates the identifier of the parity group. The RAID configuration column 462 indicates the RAID configuration (example of a redundant configuration) of the parity group. The RAID configuration is defined by a RAID level, the number of data drives, and the number of parity drives. The assigned C/R #column 463 indicates the C numbers and the R numbers of the storage drives 2 that belong to the parity group.

The power saving setting column 464 indicates whether the power saving setting of the parity group is enabled or disabled. When the power saving setting column 464 exhibits the value of "enabled", some storage drives 2 in the parity group can be set to the power saving state. Meanwhile, when the power saving setting column 464 exhibits the value of "disabled", all the storage drives 2 in the parity group are inhibited from being changed to the power saving state.

The power saving upper limit number column 465 indicates the number of storage drives 2 that are permitted to be set to the power saving state in the parity group. The power saving upper limit number column 465 has the value selected from a value equal to or smaller than the redundancy level of the parity group (number of parity drives). With this configuration, the data stored in the storage drive in a power saving state can be restored through "collection read". In this example, the power saving upper limit number column 465 matches the redundancy level of the parity group. This allows reduction of more power consumption.

The power saving target C/R #column 466 indicates the C #and R #of the storage drive 2 to be changed to the power saving state in the parity group. The number of values exhibited by the power saving target C/R #column 466 matches the value indicated by the power saving upper limit number column 465.

Figure 6:
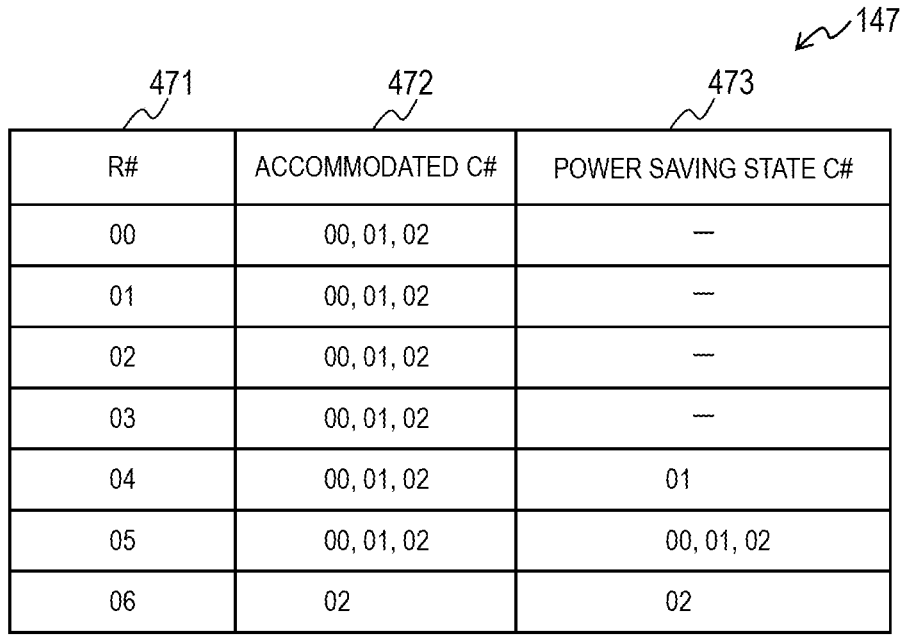
FIG. 6 shows an example of the structure of the drive box management table.

In FIG. 6, an example of the structure of the drive box management table 147 is shown. The drive box management table 147 is used to manage information on the drive boxes 3. Specifically, information on the storage drives 2 accommodated in the drive boxes 3 is shown in the drive box management table 147.

The drive box management table 147 includes an R #column 471, an accommodated C #column 472, and a power saving state C #column 473. The R #column 471 indicates the R number of the drive box 3. The accommodated C #column 472 indicates the C number of each storage drive 2 accommodated in the drive box 3. The power saving state C #column 473 indicates the C number of the storage drive 2 in a power saving state in the drive box 3.

Figure 7:
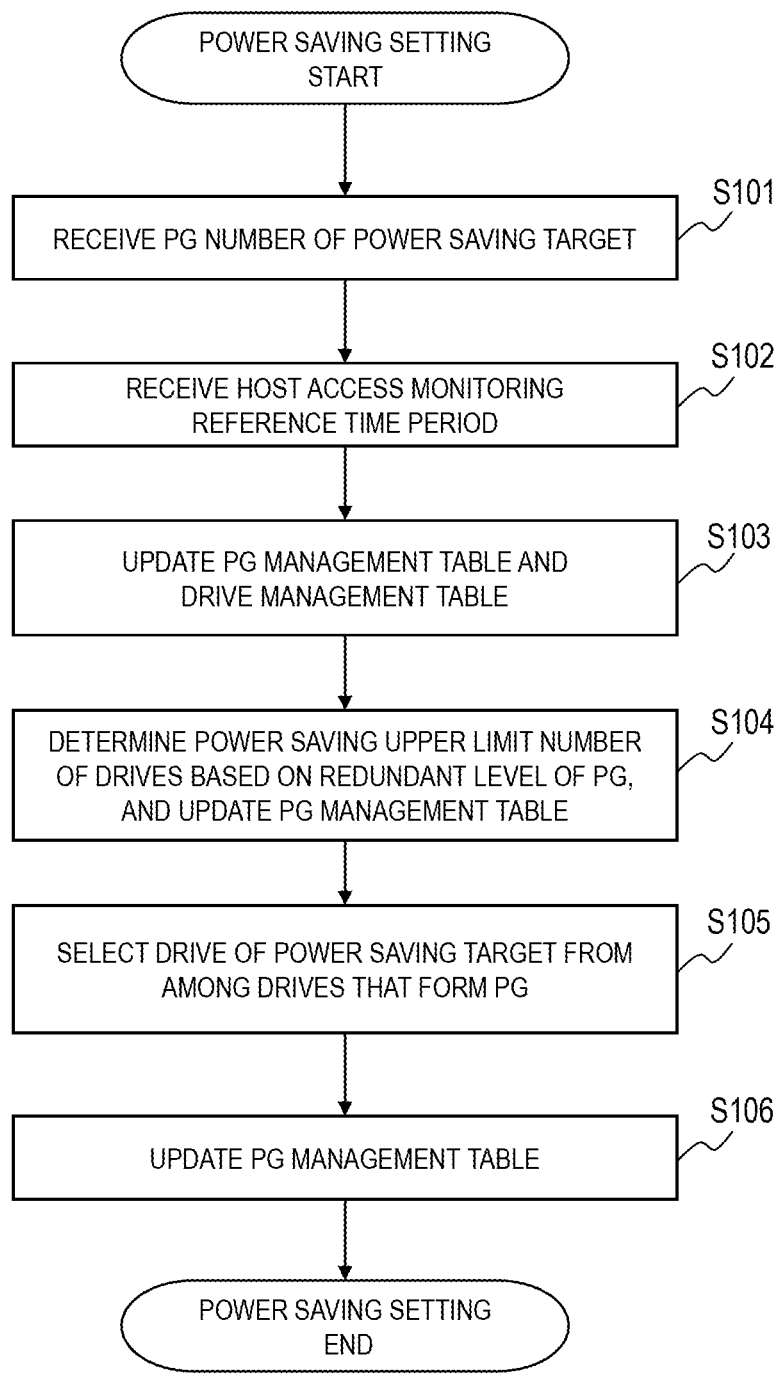
FIG. 7 is a flow chart for illustrating an example of the power saving setting of the parity group to be performed in the storage system based on input from the user.

FIG. 7 is a flow chart for illustrating an example of the power saving setting of the parity group to be performed in the storage system 1 based on input from the user. The user transmits setting data from the management computer 150 to the storage system 1. The power control program 143 forms setting information on power saving control based on a user designation received from the management computer 150.

First, the power control program 143 receives a designated parity group number of a power saving target from the management computer 150 through the management I/F 116 (Step S101). The power control program 143 further receives the value of a host access monitoring reference time period associated with the parity group number from the management computer 150 through the management I/F 116 (Step S102).

The power control program 143 updates the PG management table 146 and the drive management table 145 based on the received user designation (Step S103). Specifically, the power control program 143 sets the value in the cell of the power saving setting column 464 in the entry of the designated parity group number to "enabled" in the PG management table 146.

In addition, the power control program 143 inputs the designated value to the cell of the host access monitoring reference time period column 455 in the entry of the storage drive 2 of the designated parity group number in the drive management table 145.

Subsequently, the power control program 143 determines the upper limit number of storage drives to be set to a power saving state in the parity group based on the redundant configuration of the designated parity group. The power control program 143 uses the upper limit number to update the PG management table 146 (Step S104).

Specifically, the power control program 143 refers to the RAID configuration column 462 of the PG management table 146 to identify the redundancy level of the designated parity group. In the example of FIG. 5, the number of parity blocks P indicates the redundancy level. The power control program 143 determines the power saving upper limit number equal to or smaller than the redundancy level by a predetermined method. For example, the upper limit number matches the redundancy level. The power control program 143 inputs the determined upper limit number to the cell of the power saving upper limit number column 465 in the entry of the designated parity group.

Subsequently, the power control program 143 selects a storage drive of a power saving target from among the storage drives that form the parity group in accordance with a rule defined in advance (Step S105). Specifically, the power control program 143 refers to the PG management table 146 to acquire pairs of the R numbers and the C numbers of the storage drives 2 that form the designated parity group from the assigned C/R #column 463. A plurality of pairs can have the same R number or the same C number. The pair of the R number and the C number indicates the accommodation position of the storage drive 2.

The power control program 143 selects the storage drive to be changed to a power saving state (power saving target storage drive) based on the accommodation positions (pairs of the R numbers and the C numbers) of the storage drives 2 that form the parity group. In an example, the power control program 143 selects the power saving target storage drive based on a priority of the R number set in advance.

In an example, in descending order of the R number, a higher priority is assigned. The power control program 143 selects the upper limit number of pairs from among the pairs having the largest R number in the acquired pairs (storage drives) of the C numbers and the R numbers. In another example, in ascending order of the R number, a higher priority is assigned. The power control program 143 selects the upper limit number of pairs from among the pairs having the smallest R number in the acquired pairs of the C numbers and the R numbers. The power saving target storage drive may also be selected based on another correspondence relationship between the priority and the R number.

In another example, the power control program 143 may determine the accommodation position of the power saving target storage drive in the parity group based on the accommodation position of the power saving target storage drive in another parity group. The power control program 143 preferentially selects the R number (drive box 3) already registered in the PG management table 146.

In descending order of the number of registered R numbers in the power saving target C/R #column 466 of the PG management table 146, a higher priority is assigned. The power control program 143 selects the upper limit number of pairs from among the pairs having the largest number of registered R numbers in the acquired pairs (storage drives) of the C numbers and the R numbers. When the selectable R number is not registered, for example, the power control program 143 selects the power saving target storage drive based on the priority of the R number set in advance.

Finally, the power control program 143 uses location information on the storage drive 2 selected as the power saving target to update the PG management table 146 (Step S106). Specifically, the power control program 143 inputs the pair of the R number and the C number of the selected storage drive 2 to the cell of the power saving target C/R #column 466 in the entry of the parity group.

As described above, the power control program 143 selects the power saving target storage drive from each parity group so that the power saving target storage drives of a plurality of parity groups are biased to a specific drive box. With this configuration, it is possible to increase the possibility of the occurrence of the drive box 3 in which all the accommodated storage drives 2 are in a power saving state.

In the above-mentioned example, the storage drive 2 (slot 35) to be changed to a power saving state is set in advance in the PG management table 146. Unlike this example, the power control program 143 may newly determine the storage drive 2 to be selected when the storage drive 2 in the parity group is changed from the normal state to the power saving state. As a method for the determination, any one of the plurality of methods described above may be used.

Figure 8:
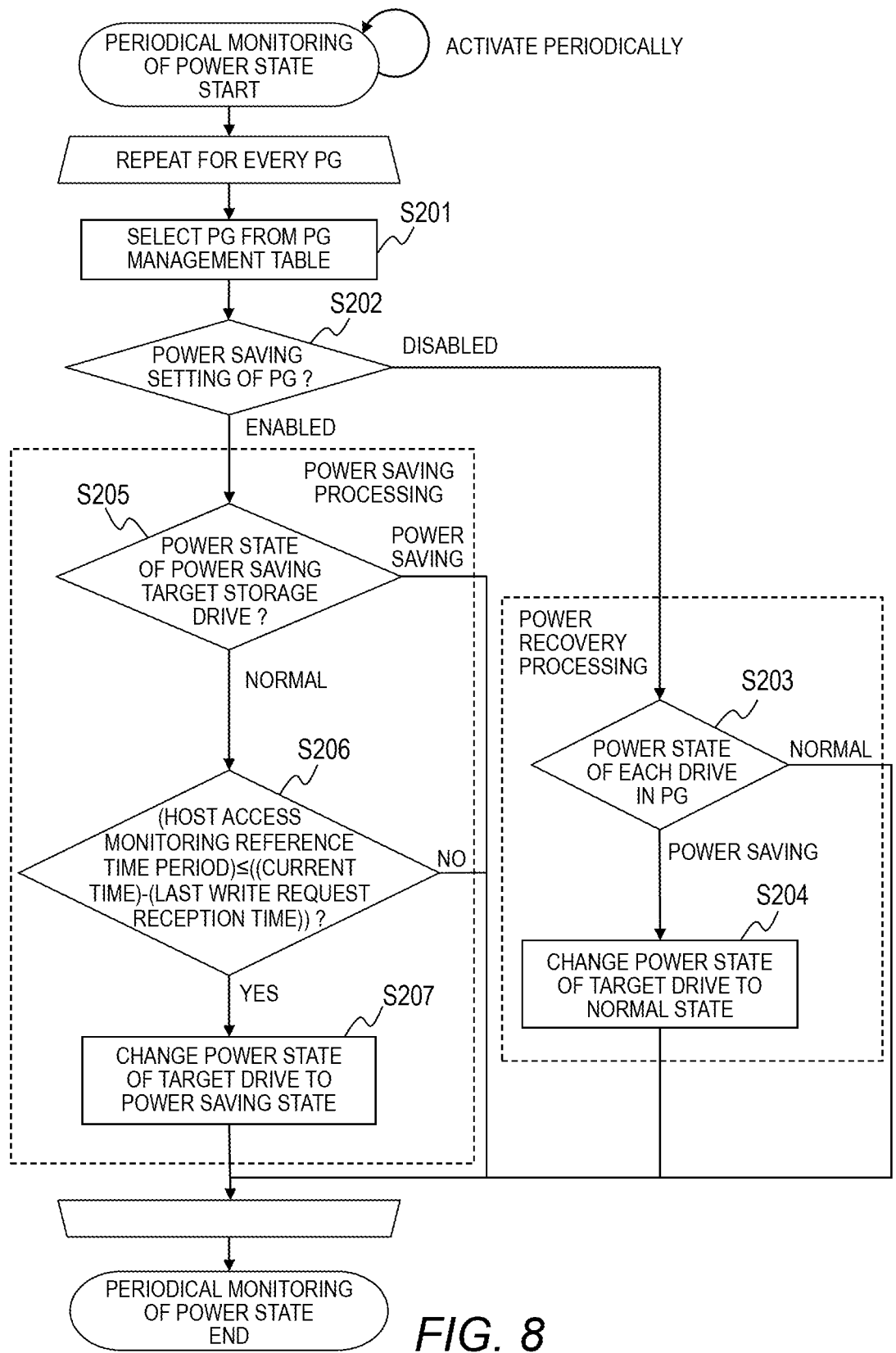
FIG. 8 is a flow chart for illustrating an example of the power control of the storage drive.

Next, a description is given of the power control of the storage drive 2. FIG. 8 is a flow chart for illustrating an example of the power control of the storage drive 2. The power control program 143 executes the processing of the flow chart illustrated in FIG. 8 periodically, for example, every 10 seconds. The power control program 143 executes the steps of the flow chart for each of the parity groups registered in the PG management table 146.

The power control program 143 first selects a parity group unselected in the current flow from the PG management table 146 (Step S201). The power control program 143 refers to the power saving setting column 464 to determine whether the power saving setting of the selected parity group is enabled or disabled (Step S202).

When the power saving setting of the parity group is disabled ("DISABLED" in Step S202), the power control program 143 refers to the power state column 454 of the drive management table 145 to examine the power state of each of the storage drives 2 belonging to the parity group (Step S203). When the storage drive 2 in a power saving state is absent ("NORMAL" in Step S203), the power control program 143 brings the processing for the selected parity group to an end.

When the storage drive 2 in a power saving state is present ("POWER SAVING" in Step S203), the power control program 143 changes the storage drive 2 in a power saving state to a normal state (Step S204). The method of changing the power state of the storage drive 2 depends on the kind of the storage drive 2. When the storage drive 2 can handle a control command for the power state, the power control program 143 transmits to the storage drive 2 the control command for causing a change from the power saving state to the normal state.

For example, a spin-down state (state in which disk rotation is stopped) corresponds to the power saving state of an HDD, and the HDD can handle the control command. The control command is transferred to the storage drive 2 through the drive I/F 113 and the expander 32.

When the storage drive 2 cannot handle the control command for the power state, the power control program 143 controls the power state of the storage drive 2 through the drive box controller 31. For example, the storage drive 2 whose power saving state is a power-off state cannot handle the control command. The power control program 143 transmits a command for instructing to power on the designated storage drive 2 to the drive box controller 31 through the management I/F 117. The drive box controller 31 powers on the designated storage drive 2.

When the power saving setting of the parity group is enabled in Step S202 ("ENABLED" in Step S202), the power control program 143 performs power saving processing on the storage drive 2. The power control program 143 refers to the power saving target C/R #column 466 of the PG management table 146 to identify the power saving target storage drive in the parity group. In addition, the power control program 143 refers to the power state column 454 of the drive management table 145 to identify the power state of each of the power saving target storage drives (Step S205).

When all the power saving target storage drives are in a power saving state ("POWER SAVING" in Step S205), the power control program 143 brings the processing for the selected parity group to an end. When any one of the power saving target storage drives is in a normal power state ("NORMAL" in Step S205), the power control program 143 executes the following steps on each of the power saving target storage drives in a normal power state.

The power control program 143 compares an elapsed time since the last write request reception time with respect to the power saving target storage drive until the current time and the host access monitoring reference time period (Step S206). The power control program 143 acquires the last write request reception time and the host access monitoring reference time period from the drive management table 145.

When the elapsed time is shorter than the host access monitoring reference time period ("NO" in Step S206), the power control program 143 maintains the power saving target storage drive in a normal power state. When the elapsed time is equal to or longer than the host access monitoring reference time period ("YES" in Step S206), the power control program 143 changes the power saving target storage drive to a power saving state (Step S207).

As described above, the method of changing the storage drive to a power saving state depends on the type of the storage drive. The power control program 143 can learn the type of the storage drive by referring to the drive management table 145. With this configuration, the power saving state can be appropriately achieved in accordance with the specifications of the storage drive.

After the processing illustrated in FIG. 8, the power control program 143 refers to the drive box management table 147 to search for the drive box 3 in which all the accommodated storage drives 2 are in a power saving state. When all the accommodated storage drives 2 in the drive box 3 are in a power saving state, the power control program 143 requests the drive box controller 31 of the drive box 3 to cause a change to a power saving state through the management I/F 117. The power control program 143 may also power off the drive box 3 to change the drive box 3 to a power saving state.

The following description is directed to an example of processing to be performed on the I/O request (write request or read request) received from the host server 100. For the sake of simplicity of the description, the number of power saving target storage drives in the parity group is one.

Figure 9:
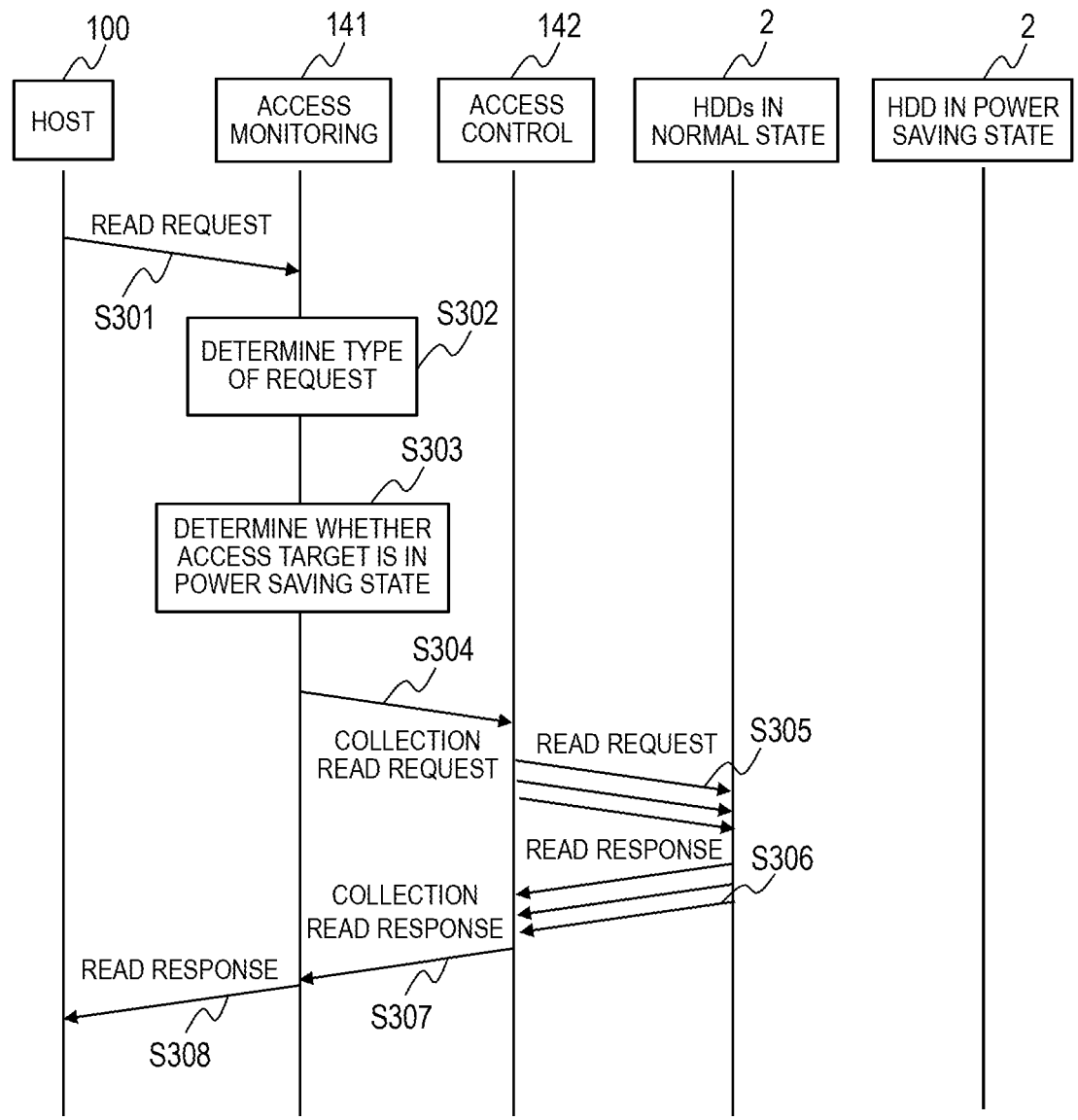
FIG. 9 is a sequence diagram of the processing for a read request with the request destination being an HDD.
Figure 10:
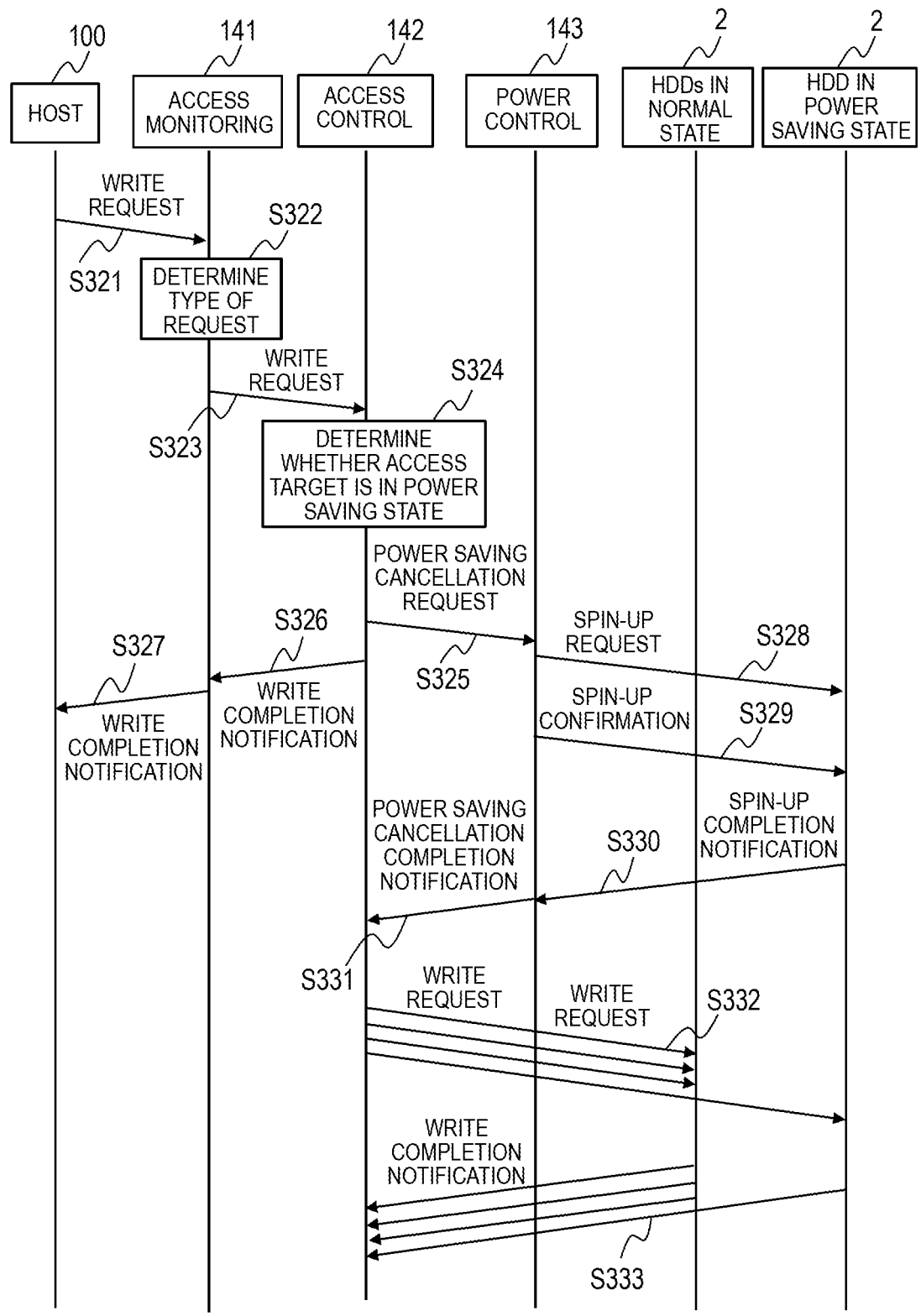
FIG. 10 is a sequence diagram of the processing for a write request with the request destination being an HDD.

FIG. 9 is a sequence diagram of the processing for a read request with the request destination being an HDD, and FIG. 10 is a sequence diagram of the processing for a write request with the request destination being an HDD. The HDD has a power saving mode (spin-down mode) of stopping the rotation of the magnetic disk.

The access monitoring program 141 of the storage controller receives a read request from the host server 100 (Step S301). The access monitoring program 141 refers to the received read request to determine the type of the received request (Step S302). The access monitoring program 141 refers to the received read request and volume management information (not shown) to identify the request destination storage drive and its address, and refers to the drive management table 145 to determine the power state of each of the request destination storage drives (Step S303).

It is assumed that the request destination storage drives are HDDs and one HDD of the request destination storage drives is in a power saving state. The following description is directed to the reading of data stored in the HDD in a power saving state.

The access monitoring program 141 requests the access control program 142 to perform a collection read by designating the HDD in a power saving state and its address (Step S304). The collection read is processing for restoring data stored in an HDD in the parity group from the data collected from the other HDDs in the parity group.

The access control program 142 refers to the PG management table 146 to identify a power saving target HDD 2 in the request destination parity group. The HDDs 2 other than the power saving target HDD 2 are HDDs in a normal state. The access control program 142 transmits, to each of the HDDs 2 in a normal state, a read request that designates the address of the data for restoring the read data stored in the HDD 2 in a power saving state (Step S305).

The access control program 142 receives a read response including target data from the HDD 2 of a read request destination (Step S306). The access control program 142 restores the data stored in the HDD 2 in a power saving state from the collected data, and returns a collection read response including the restored data to the access monitoring program 141 (Step S307). The access monitoring program 141 returns a read response including the restored data to the host server 100 (Step S308).

As described above, when the storage drive storing the data of a host read request is in a power saving state, it is possible to reduce a delay of the host response by restoring the target data through a collection read.

When the storage drive storing the data of the host read request is in a normal state, the target data is read from the storage drive, which allows a quick host response. When the target data corresponding to the collection read is included in the host read request, it suffices that the target data is read one time from the HDD in a normal state.

For example, when the target of the host read request is one stripe line and the HDD in a power saving state stores a host data block, the data blocks are read from all the HDDs in a normal state in the parity group. The host data block stored in the HDD in a power saving state is restored from the redundant data and the other host data.

Next, with reference to FIG. 10, a description is given of a sequence for processing a write request. The access monitoring program 141 receives a write request from the host server 100 (Step S321). The access monitoring program 141 refers to the received write request to determine the type of the received request (Step S322).

The access monitoring program 141 refers to the received write request and volume management information (not shown) to identify the request destination storage drive and the address, and transmits the write request to the access control program 142 by designating the request destination storage drive and its address (Step S323). The access monitoring program 141 updates the drive management table 145.

The access control program 142 stores the host data stored in the host I/F 111 in the cache area of the memory 114. The access control program 142 refers to the drive management table 145 to determine the power state of each of the request destination storage drives (Step S324). It is assumed that the request destination storage drives are HDDs and one HDD of the request destination storage drives is in a power saving state.

The access control program 142 designates the HDD in a power saving state to transmit a power saving cancellation request to the power control program 143 (Step S325). The access control program 142 returns a write completion notification to the access monitoring program 141 (Step S326).

The access monitoring program 141 returns a write completion notification to the host server 100 (Step S327). In this manner, before the write data is transmitted to the storage drive, a write response is quickly returned to the host server 100. Any one of the power saving cancellation request and the write completion notification may be transmitted first.

The power control program 143 transmits a spin-up request to a power saving state HDD 2 through the drive I/F 113 and the expander 32 (Step S328). After that, the power control program 143 transmits a spin-up confirmation request to the power saving state HDD 2 through the drive I/F 113 and the expander 32 (Step S329). When receiving spin-up completion notification in response to the spin-up confirmation request (Step S330), the power control program 143 returns a power saving cancellation completion notification to the access control program 142 (Step S331).

The access control program 142 transmits (destages) write requests along with the write data to write destination HDDs 2 including the HDD 2 that has changed from the power saving state to the normal state (Step S332). The access control program 142 receives the write completion notifications from the HDDs 2 to which the write data has been written (Step S333).

In the above-mentioned example, in response to the write request received from the host server 100, the HDD in a power saving state is recovered to the normal state. It is expected that the write request with respect to the HDD is to be continuously received after that. Therefore, when the write request is received, the HDD is instantaneously recovered to the normal state independently of the free capacity of a cache. With this configuration, it is possible to effectively prevent a delay of the host response due to the deficiency of the free capacity of the cache.

Unlike this example, it may be determined whether or not to recover the HDD in a power saving state based on the free capacity of the cache area.

When the free capacity of the cache area reaches a predetermined value, the access control program 142 may change the HDD in a power saving state to the normal state for the destage.

In the above-mentioned example, the power state is examined for each target HDD of a host write request (Step S303). Unlike this example, the storage controller 11 may determine whether or not the target parity group of the host write request is in a power saving state, that is, the parity group includes the HDD in a power saving state. When the parity group is in a power saving state, the storage controller 11 may change all the HDDs in a power saving state to a normal state. Those points are the same as in the example of SSDs described below.

Next, a description is given of an example of processing to be performed on read requests and write requests with respect to a parity group of SSDs. In the same manner as in the example described with reference to FIG. 9 and FIG. 10, the number of power saving target storage drives in the parity group is assumed to be one.

Figure 11:
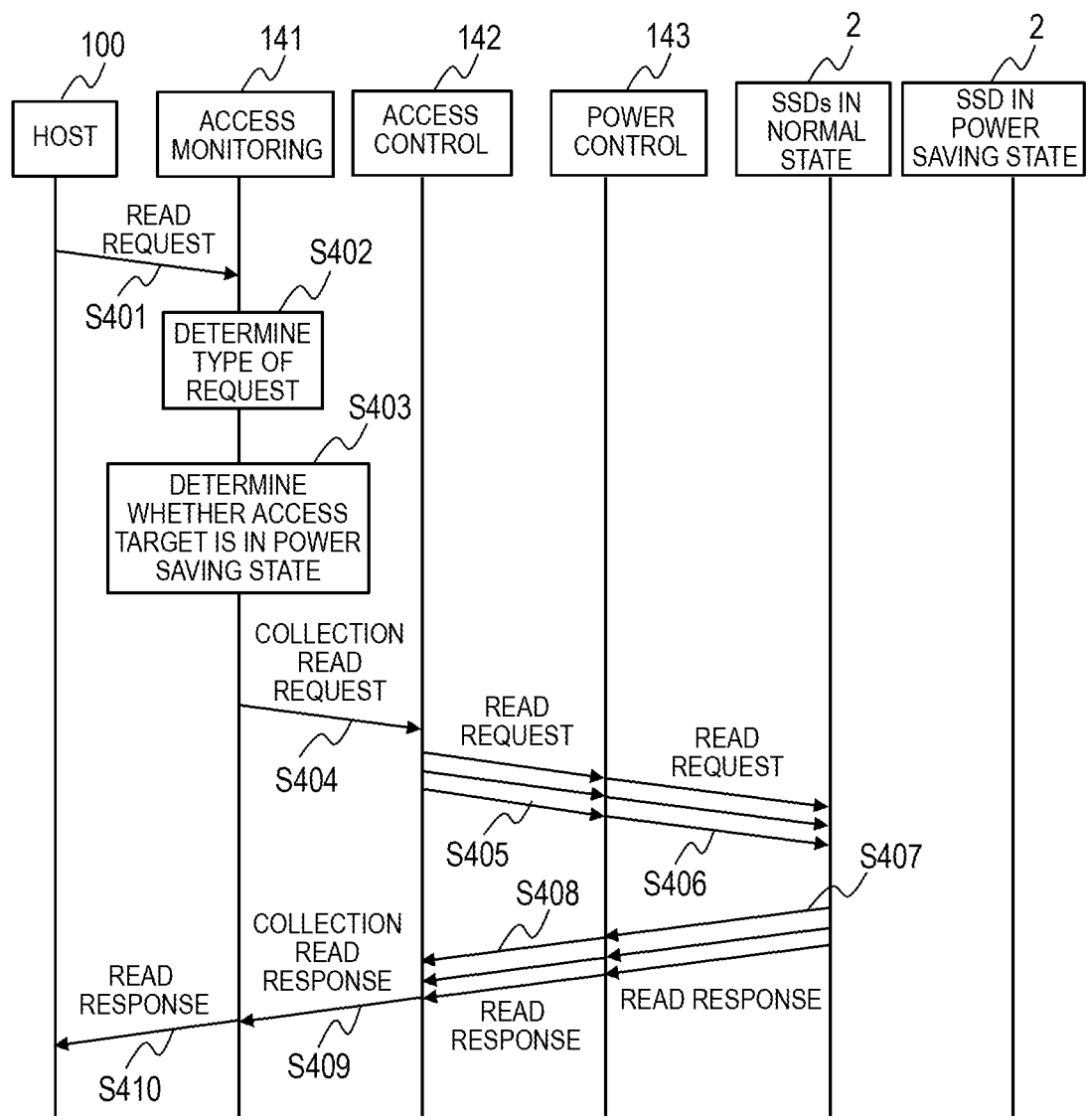
FIG. 11 is a sequence diagram of the processing for a read request with the request destination being an SSD.
Figure 12:
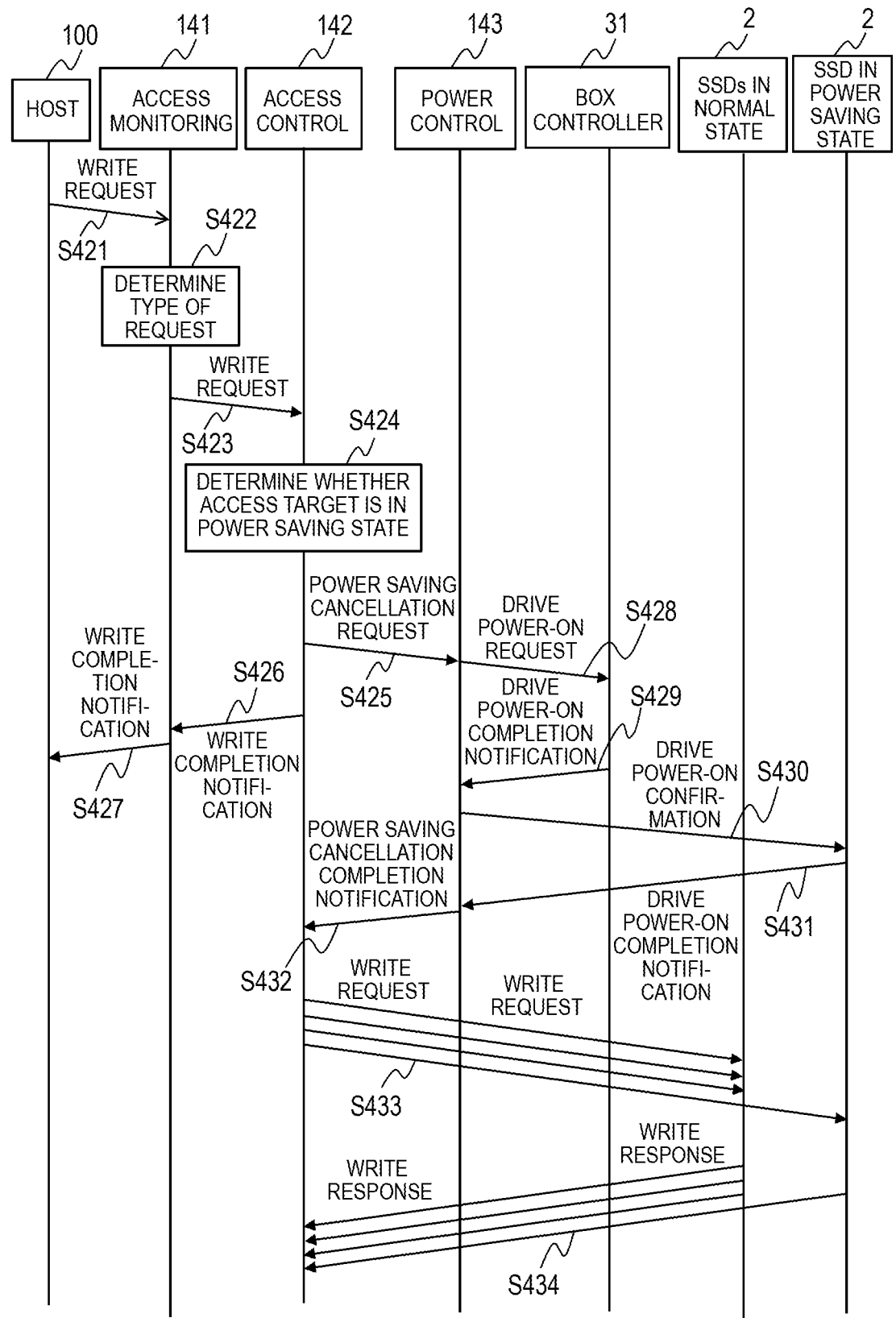
FIG. 12 is a sequence diagram of the processing for a write request with the request destination being an SSD.

FIG. 11 is a sequence diagram of the processing for a read request with the request destination being an SSD, and FIG. 12 is a sequence diagram of the processing for a write request with the request destination being an SSD. In this example, the power saving state of the SSD is a power-off state.

The access monitoring program 141 of the storage controller receives a read request from the host server 100 (Step S401). The access monitoring program 141 refers to the received read request to determine the type of the received request (Step S402). The access monitoring program 141 refers to the received read request and volume management information (not shown) to identify the request destination storage drive and its address, and refers to the drive management table 145 to determine the power state of each of the request destination storage drives (Step S403).

It is assumed that the request destination storage drives are SSDs and one SSD of the request destination storage drives is in a power saving state. The following description is directed to the reading of data stored in the SSD in a power saving state.

The access monitoring program 141 requests the access control program 142 to perform a collection read by designating the SSD in a power saving state and its address (Step S404). The access control program 142 refers to the PG management table 146 to identify a power saving target SSD 2 in the request destination parity group. The SSDs 2 other than the power saving target SSD 2 are SSDs in a normal state. The access control program 142 transmits, to each of the SSDs in a normal state, a read request that designates the address of the data for restoring the read data stored in the SSD in a power saving state (Step S405).

The access control program 142 receives a read response including target data from the SSD 2 of a read request destination (Step S406). The access control program 142 restores the data stored in the SSD in a power saving state from the collected data, and returns a collection read response including the restored data to the access monitoring program 141 (Step S407). The access monitoring program 141 returns a read response including the restored data to the host server 100 (Step S408).

As described above, when the SSD storing the data of a host read request is in a power saving state, it is possible to reduce a delay of the host response by restoring the target data through a collection read. When the SSD storing the data of the host read request is in a normal state, the target data is read from the SSD.

Next, with reference to FIG. 12, a description is given of a sequence for processing a write request. The access monitoring program 141 of the storage controller receives a write request from the host server 100 (Step S421). The access monitoring program 141 refers to the received write request to determine the type of the received request (Step S422).

The access monitoring program 141 refers to the received write request and volume management information (not shown) to identify the request destination storage drive and the address, and transmits the write request to the access control program 142 by designating the request destination storage drive and its address (Step S423). The access monitoring program 141 updates the drive management table 145.

The access control program 142 stores the host data stored in the host I/F 111 in the cache area of the memory 114. The access control program 142 refers to the drive management table 145 to determine the power state of each of the request destination storage drives (Step S424). It is assumed that the request destination storage drives are SSDs and one SSD of the request destination storage drives is in a power saving state.

The access control program 142 designates the SSD in a power saving state to transmit a power saving cancellation request to the power control program 143 (Step S425). The access control program 142 returns a write completion notification to the access monitoring program 141 (Step S426). The access monitoring program 141 returns a write completion notification to the host server 100 (Step S427). In this manner, before the write data is transmitted to the storage drive, a write response is quickly returned to the host server 100. Any one of the power saving cancellation request and the write completion notification may be transmitted first.

The power control program 143 transmits a drive power-on request that designates a target SSD 2 to the drive box controller 31 through the management I/F 117 (Step S428). After the target SSD 2 is powered on, the drive box controller 31 returns a drive power-on completion notification to the power control program 143 through the management I/F 117 (Step S429). After that, the power control program 143 transmits a drive power-on confirmation request to the target SSD 2 (Step S430).

When receiving a drive power-on completion notification in response to the drive power-on confirmation request (Step S431), the power control program 143 returns a power saving cancellation completion notification to the access control program 142 (Step S432).

The access control program 142 transmits (destages) write requests along with the write data to write destination SSDs 2 including the SSD 2 that has changed from the power saving state to the normal state (Step S433). The access control program 142 receives the write completion notifications from the SSDs 2 to which the write data has been written (Step S434).

In the sequence described with reference to FIG. 9 to FIG. 12, some of the steps may be executed by a component different from the processor 112. For example, the processing to be performed by the power control program 143 in FIG. 10 and FIG. 12 may be executed by each of the drive I/F 113 and the management I/F 117.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. A storage system, comprising:
a redundancy group formed of a plurality of storage drives configured to store host data and redundant data in a distributed manner; and
a controller configured to control access to the redundancy group,
the controller being configured to:
select, from among the plurality of storage drives in the redundancy group, a part of the plurality of storage drives in an upper limit number equal to or smaller than a redundancy level of the redundancy group, and set the part of the plurality of storage drives to a power saving state;
acquire, from the part of the plurality of storage drives, a pair including a first value and a second value;
select, from the part of the plurality of storage drives, a storage drive based on the pair meeting a rule;
receive, from a host, a read request with respect to a target storage drive included in the redundancy group; and
restore, when the target storage drive is in the power saving state, target data corresponding to the read request from data collected from a part of the plurality of storage drives different from the target storage drive in the redundancy group, and return the target data to the host,
wherein the pair denotes a location based on the first value and the second value.

2. The storage system according to claim 1, wherein the upper limit number matches the redundancy level.

3. The storage system according to claim 1, wherein the controller is configured to read, when the target storage drive of the read request is in a normal state, the target data corresponding to the read request from the target storage drive.

4. The storage system according to claim 1,
wherein the controller comprises a cache area for temporarily holding write data with respect to the redundancy group, and
wherein the controller is configured to:
store the write data in the cache area, and return a completion response to a write request for the write data to the host before writing the write data to the redundancy group;
change, when the write data includes first data to be written to one of the plurality of storage drives in the power saving state in the redundancy group, the one of the plurality of storage drives in the power saving state to a normal state; and
write the first data stored in the cache area to the one of the plurality of storage drives that has been changed to the normal state.

5. The storage system according to claim 4, wherein the controller is configured to change the one of the plurality of storage drives in the power saving state to the normal state in response to the write request.

6. The storage system according to claim 1, further comprising:
a plurality of redundancy groups including the redundancy group; and
a plurality of drive boxes configured to accommodate the plurality of redundancy groups,
wherein the controller is configured to:
hold information for managing the plurality of drive boxes;
refer to the information for managing the plurality of drive boxes to select one of the plurality of storage drives to be set to the power saving state in each of the plurality of redundancy groups in accordance with a rule defined in advance based on an accommodation position; and
change one of the plurality of drive boxes in which all the plurality of accommodated storage drives are in the power saving state to the power saving state.

7. A method of controlling access to a redundancy group formed of a plurality of storage drives configured to store host data and redundant data in a distributed manner, the method comprising:
selecting, from among the plurality of storage drives in the redundancy group, a part of the plurality of storage drives in an upper limit number equal to or smaller than a redundancy level of the redundancy group, and setting the part of the plurality of storage drives to a power saving state;
acquiring, from the part of the plurality of storage drives, a pair including a first value and a second value;
selecting, from the part of the plurality of storage drives, a storage drive based on the pair meeting a rule;
receiving, from a host, a read request with respect to a target storage drive included in the redundancy group; and
restoring, when the target storage drive is in the power saving state, target data corresponding to the read request from data collected from a part of the plurality of storage drives different from the target storage drive in the redundancy group, and returning the target data to the host,
wherein the pair denotes a location based on the first value and the second value.

8. The method according to claim 7, wherein the upper limit number matches the redundancy level.

9. The method according to claim 7, further comprising reading, when the target storage drive of the read request is in a normal state, the target data corresponding to the read request from the target storage drive.

10. The method according to claim 7, further comprising:
storing the write data in a cache area for temporarily holding write data with respect to the redundancy group, and returning a completion response to a write request for the write data to the host before writing the write data to the redundancy group;
changing, when the write data includes first data to be written to one of the plurality of storage drives in the power saving state in the redundancy group, the one of the plurality of storage drives in the power saving state to a normal state; and
writing the first data stored in the cache area to the one of the plurality of storage drives that has been changed to the normal state.

11. The method according to claim 10, further comprising changing the one of the plurality of storage drives in the power saving state to the normal state in response to the write request.

12. The method according to claim 7, further comprising:
referring to information for managing a plurality of drive boxes configured to accommodate a plurality of redundancy groups;
selecting one of the plurality of storage drives to be set to the power saving state in each of the plurality of redundancy groups in accordance with a rule defined in advance based on an accommodation position; and changing one of the plurality of drive boxes in which all the plurality of accommodated storage drives are in the power saving state to the power saving state.

* * * * *